United States Patent [19]

Szabo et al.

[11] Patent Number: 4,745,273
[45] Date of Patent: May 17, 1988

[54] METHOD AND APPARATUS FOR MEASURING LUMINOSITY WITH CONTROLLED SENSITIVITY

[75] Inventors: Bela Szabo; Jenö Vágvölgyi; István Fehér, all of Budapest, Hungary

[73] Assignee: MTA Kozponti Fizikai Kutato Intezete, Budapest, Hungary

[21] Appl. No.: 86,229

[22] PCT Filed: Oct. 5, 1984

[86] PCT No.: PCT/HU84/00047
§ 371 Date: May 22, 1985
§ 102(e) Date: May 22, 1985

[87] PCT Pub. No.: WO85/01801
PCT Pub. Date: Apr. 25, 1985

Related U.S. Application Data

[63] Continuation of Ser. No. 760,749, May 22, 1985, abandoned.

[30] Foreign Application Priority Data

Oct. 7, 1983 [HU] Hungary ............... 3470/83

[51] Int. Cl.$^4$ ............... G01T 1/11
[52] U.S. Cl. ............... 250/207; 250/337; 250/484.1
[58] Field of Search ............... 250/207, 213 VT, 337, 250/484.1; 313/532-536, 103 R, 103 CM, 104, 105 R, 105 CM

[56] References Cited

U.S. PATENT DOCUMENTS 3,657,535 4/1972 Bjarngard et al. ............... 250/337
3,988,590 10/1976 Johnson ............... 250/207
4,105,918 8/1978 Miyagawa et al. ............... 250/484.1
4,436,994 3/1984 Van Vliet et al. ............... 250/207
4,563,707 1/1986 Kishida ............... 250/207
4,631,410 12/1986 Nickles ............... 250/207

OTHER PUBLICATIONS

V. V. Matveev et al., "Pribory Dlya Izmerenia Ionizirujuschikh Izlucheny", 1967, Atomizdat (Moscow), see pp. 394, 395, 398, 399.
G. D. Bakhtiarov et al., "Analogo-Tsifrovye Preobrazavateli", 1980, Sovetskoe Radio (Moscow), pp. 232-233.
P. Horowitz et al., "Iskusstvo Skhemotekhniki", vol. 1, 1983, Mir (Moscow), pp. 166-167.

Primary Examiner—Edward P. Westin
Attorney, Agent, or Firm—Young & Thompson

[57] ABSTRACT

Method for luminosity measuring advantageously in TLD evaluation equipment in the course of which a photomultiplier current is made proportional with light intensity and the current is measured; and sensitivity control of photomultiplier is conducted by varying its supply voltage if the current is above a given level. The change is stored. The measurement is conducted in analog or digital form. Circuit arrangement to implement the procedure has a photomultiplier tube (11), high voltage power supply and level sensor, the input of the photomultiplier tube being connected to the output of the high voltage power supply, the output of the tube being connected to the input of the level sensor. A control unit (14) is provided, whose input is connected to the output of the level sensor (12), and its output is connected to the input of the high voltage power supply. The level sensor may comprise analog to digital converter (21), digital to analog converter (22), comparator (23) and digital counter (24) connected in series to analog to digital converter (21), decimal counter (25) and control register (26) connected in series. The control unit (14) has a reference source (27) and calibrating divider (28), the inputs of which are connected to the output of the reference source (27). The calibrating divider has three resistors ($R_1$, $R_2$, $R_3$).

2 Claims, 1 Drawing Sheet

METHOD AND APPARATUS FOR MEASURING LUMINOSITY WITH CONTROLLED SENSITIVITY

This application is a continuation of application Ser. No. 760,749, filed 5/22/85, now abandoned.

The object of the present invention is a method and a circuit arrangement for luminosity measuring, over a range of at least six orders of magnitude, advantageously in "TLD" equipment.

In the field of luminosity measurements, photomultiplier tubes (PMT) are very often applied in scientific and technical practice.

For their operation, such multiplier tubes require high voltage (500-1500 V) power suppllies. The sensitivity of the tubes depends considerably on supply voltage, but in the case of a stable supply voltage the luminosity to current conversion ratio of the multiplier tube - that is, its sensitivity - is also stable (if constant temperature is assumed).

Other well-known devices are available for measuring luminosity, for example vacuum photodiodes, solid state photodiodes and phototransistors, but their sensitivity is 3-4 orders of magnitude lower than the sensitivity of multiplier tubes. Therefore, to detect very low level luminosities - for example $10^{-12}$-$10^{-13}$ lumen intensity - only multiplier tubes are suitable and applied at present. Luminosity levels such as this must be processed in scientific and technical practice, e.g. in the field of thermoluminescent dosimetry (TLD) or measuring signals with scintillation detectors.

But in these fields, not only do too low luminosity levels occur, but levels 8 orders of magnitude higher, say for example $10^{-4}$-$10^{-5}$ lumen magnitude, also occur. If a multiplier tube is set to sense the lower luminosity levels - which means greater sensitivity - it may become saturated in the case of too great a light intensity, that is, it "goes blind".

Moreover, because of the large output current, we have to apply a high current resistor-network, which means a needlessly high load for the high voltage power supply in most cases, and this heats the multiplier tube thereby reducing its stability.

The current output by the multiplier tube is usually displayed in digital form by means of analog to digital converters, which may be luminosity level sensing, but can also operate by summing the luminosity over a certain time interval, such as the method developed in thermoluminescent does measurements.

In the case of a digital display, generally 3-4 digits of readout are required because of the necessary 0.1% measuring accuracy. For a 3-4 digit display, we need to use a decimal point and display the exponent, in order to cover a measuring range of 6-8 orders. In view of this, the operation of the signal processing circuit must be appropriately modified. A convenient way of doing this is to change the conversion factor of the analog to digital converter; but this method does not prevent saturation of the multiplier tube if higher luminosity levels are applied.

The present invention seeks to solve the problem in "TLD" measurements by eliminating the saturation of multiplier tubes in the case of greater light intensities on the one hand, and by making possible the measuring of luminosity over more orders of magnitude on the other.

Thus the task to be solved by this invention may be considered to be the creation of a method and circuit arrangement to reduce the saturation or sensitivity of the multiplier tube by a well-defined factor, thus rendering it suitable for measuring light quantities over more orders of magnitude.

The invention is based on the concept that the sensitivity of the multiplier tube may be very precisely set by changing the input voltage, and it can be changed over more orders of magnitude, and in the case of switching from a higher voltage or sensitivity to a lower one, the multiplier tube can rapidly adjust to the lower sensitivity level. For example in thermolluminescent dosimetry the time required for light quantity measurements is about 10-30 seconds. The time required for switching is 10-20 milliseconds. If the worst case is presumed, the error caused by this is less than 0.1%. For example this error is invisible in the case of three-digit display and on the other hand the probable accuracy of "TL" dosimetry is not better than 0.5% so an error of 0.1% is negligible.

The method applied in this invention is an improvement of another well-known procedure in which a current is produced that is proportional to the light intensity, and this current is measured, and the luminosity to current conversion is performed by a photomultiplier.

The improvement according to the invention is that at the same time or in parallel with current measuring we compare the current, and if the current is higher than a given level, we decrease the sensitivity of the photomultiplier, advantageously by one order of magnitude, by changing the supply voltage, and this change in order is stored, for example, by a register, and measurement and comparison are then continued.

In the sense of the invention it is practical to compare the current to be measured using a linear circuit. In other words, it is practical to transform the current to a digital signal, and then to measure and compare this digital signal.

The circuit arrangement applied in this invention is an improvement of a well-known circuit arrangement which contains a photomultiplier tube with a high voltage power supply and level sensor, the input of the photomultiplier tube being connected to the output of the high voltage power supply, and the output of the tube being connected to the input of the level sensor.

The improvement according to the invention is that this circuit arrangement also has a control unit whose input is connected to the output of the level sensor through a control line, and whose output is connected to the input of the high voltage power supply through a reference line.

In the sense of the invention it is practical if the level sensor has an analog to digital converter, a digital to analog converter, a comparator and a digital counter, connected in series in such a way that the count input of the digital counter is connected to the output of the analog to digital converter through an impulse line, and the order-select input of this counter is connected to the output of the comparator through the control line.

Namely it is practical if the level sensor has an analog to digital converter, decimal counter and control register, each connected in series in a way that the control register output is connected to the preset input of the decimal counter through the preset line.

Moreover it is practical if the control unit has a reference source and a calibrating divider, the inputs of the said calibrating divider being connected to the output of the reference source through a stable voltage line and also to the control line. The output of the calibrating divider is connected to the reference line.

Moreover it is also practical, if the calibrating divider has three resistors designated hereafter as first, second and third, each resistor being connected to the reference line by one pole, the other pole of the first resistor being connected to the stable voltage line, and the other pole of the second resistor being connected to ground and the other pole of the third resistor being connected to the control line.

The invention is presented in more detail hereinafter with reference to the accompanying drawings, in which.

Figure 1:
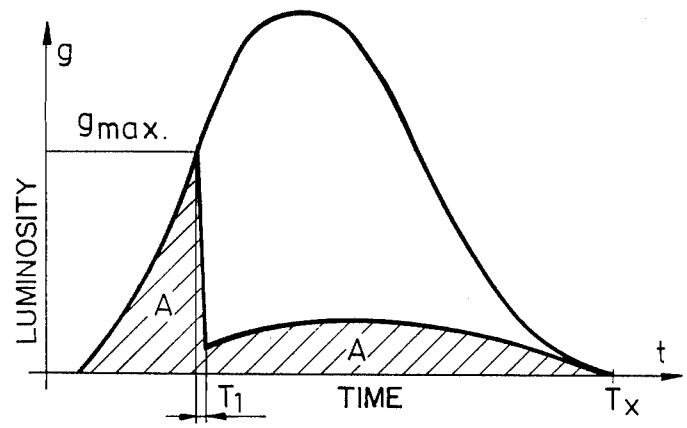
FIG. 1 illustrates the timing of the method applied in the invention.

In the diagram of FIG. 1 we introduce the summing method of thermoluminescent dosimetry based on the principle of sensitivity modification. If a thermoluminescent dosimeter is evenly heated it will radiate light after a certain time. The increase of temperature or time, on the abscissa, causes an increase in the radiated light, on the ordinate, and later this light decreases with increasing temperature. If a light-intensity diagram is plotted it shows a bell-shaped curve which is known as the glow curve. The area below this curve or the total light quantity is proportional to the dose and the purpose of TLD measurement is to determine this area. The $g_{max}$ light-current is the saturation current of the multiplier tube and in the normal case the tube cannot follow the "glow" curve so the supply voltage of the multiplier tube is decreased with the state procedure. As an example, the sensitivity of the multiplier tube is decreased by one order of magnitude, and then we continue the measuring of light quantity and the order-change is displayed on the decimal display. The total light summing time $T_x$ is generally 10-30 seconds, and the switching time $T_1$ is les than 10 milliseconds so the uncertainty of the summing caused by the switching time is negligible, as may be seen in the figure.

Figure 2:
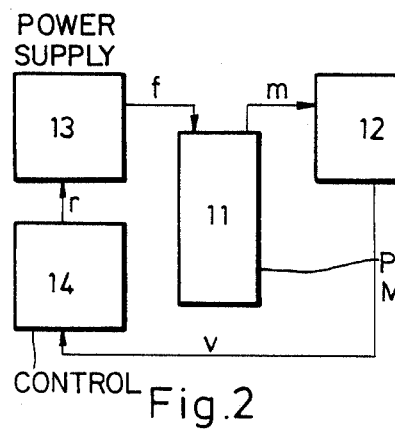
FIG. 2 illustrates an embodiment of the circuit arrangement applied in the invention.

In FIG. 2 one possible circuit arrangement is shown according to the invention. This circuit arrangement has a photomultiplier tube 11, high voltage power supply 13 and level sensor 12. The input of the photomultiplier tube 11 is connected to the output of the high voltage power supply 13 through the voltage line f, and the output of the tube is connected to the input of the level sensor 12 through the current line m. The circuit arrangement also has a control unit 14. The input of the control unit 14 is connected to the output of the level sensor 12 through the control line v, and the output of the control unit is connected to the input of the high voltage power supply 13 through the reference line r.

The high voltage power supply 13 feeds the multiplier tube 11 which in turn senses light, for example, that emitted by the TLD, and the light-current of the multiplier tube 11 reaches the level sensor 12 through the current line m. At a certain current level, in practice slightly lower than the saturation current $g_{max}$ of the multiplier tube 11, the level sensor gives a switching signal to the control unit 14 through the control line v and control unit 14 then determines the output voltage of the high voltage power supply 13 through reference line r. The effect of the switching signal causes the control unit 14 to decrease the output voltage of the high voltage power supply 13 through the reference line r. It is practical to set the decrease to be rounded off to the next order of magnitude lower than the original value.

Figure 3:
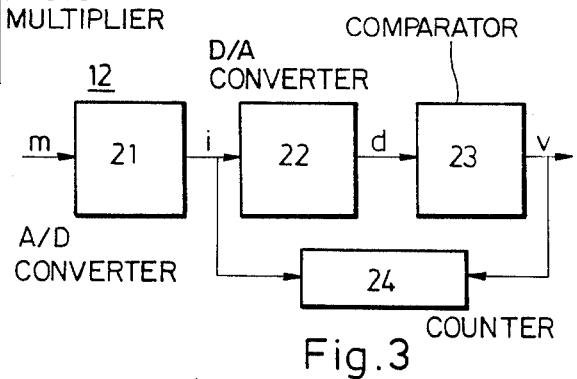
FIG. 3 shows a possible realization of a level sensor applied in the invention.

In FIG. 3 a possible realization of the level sensor according to the invention is shown. The level sensor 12 has an analog to digital converter 21, a digital to analog converter 22, a comparator 23 and a digital counter 24 all of which are connected in series. The count input of the digital counter 24 is connected to the output of the analog to digital converter 21 through the impulse line i, the order-select input of the counter is connected to the output of the comparator 23 through control line v.

The current of the multiplier tube 11 is converted to impulses by the analog to digital converter 21, and the frequency of these impulses is directly proportional to the current of the multiplier tube. The impulses reach the digital to analog converter 22 and the digital counter 24 count input through the impulse line i. The digital to analog converter 22 transmits a voltage to the analog line d that is proportional to the frequency, and this line is connected to the input of the comparator unit 23. The comparator unit 23 is set so that its threshold is slightly lower than the saturation current of the multiplier tube. At this said level it gives a switching signal to the control unit 14 through the control line v, as well as to the order-select input of the digital counter 24.

Figure 4:
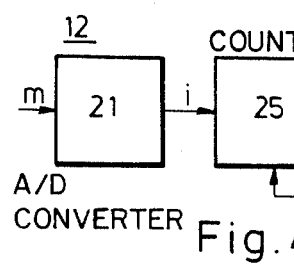
FIG. 4 shows another possible realization of level sensor.

In FIG. 4 another example of a circuit arrangement for a level sensor according to the invention is shown. According to this the level sensor 12 has an analog to digital converter 21, decimal counter 25 and control register 26, connected in series. The output of the control register 26 is connected to the preset input of the decimal counter 25 through the preset line b. The impulses of the analog to digital converter 21 reach the decimal counter 25 through the impulse line i. The overflow output of the decimal counter 25 transmits a carry impulse to the input of the control register 26 through the carry line c. The control register 26 transmits a switching signal to the order-select input of the decimal counter 25 through the preset line b, as well as switching the control unit 14 through the control line v.

Figure 5:
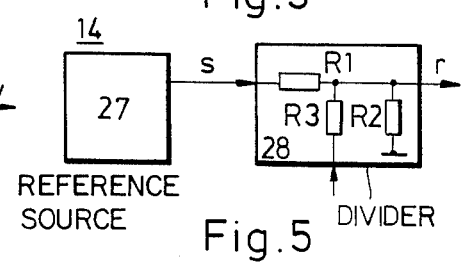
FIG. 5 shows a possible configuration of the control units applied in the invention.

In FIG. 5 a possible realization of the control unit according to the invention is shown. Thus, the control unit 14 has a reference source 27, and a calibrating divider 28. The inputs of the calibrating divider 28 are connected to the reference source 27 through the stable voltage line s and to the control line v, its output being connected to the reference line r.

The calibrating divider according to the invention is also shown in FIG. 5. The calibrating divider 28 has three resistors R1, R2, R3, each connected to the reference line r by one pole. The other pole of the first resistor R1 is connected to the stable voltage line s; the other pole of the second resistor R2 is connected to ground; and the other pole of the third resistor R3 is connected to the control line v.

The most usual treatment of the high voltgae power supply 13 is that its output voltage is compared with a reference voltage by an internal circuit. The output voltage is in a closed connection with the reference voltage which appears on the reference line r in the drawings. In this realization the voltage of the reference source 27 is divided to the desired value by the calibrating divider 28. The calibration occurs such that the voltage divided by the R1 and R2 resistors adjusts the high voltage power supply 13 to the original value through the reference line r. The level obtained through the control line v, for example, 0 V, switches the R3 resistor into the division. The voltage of the reference line r is thereby varied and so the high voltage is also changed. It is practical to adjust the value of resistors R1, R2, R3 so that the varied high voltage would make the sensitivity of the multiplier tube 11 decrease by entire orders of magnitude.

The advantages of the method and circuit arrangement according to the invention may be summarized as follows:

it prevents the saturation of the multiplier tube thereby eliminating the non-linearity error of luminosity to current conversion.

the measuring range of the photosensitive system is increased by more orders of magnitude the divider circuit of the multiplier tube may be of a low current type whereby the load and the noise of the high voltage power supply are smaller the electrical power dissipation is lower, which means less heating of the tube and thus the temperature of the tube decreases and the stability of the tube increases.

We claim:

1. In a method of thermoluminescent dosimetry comprising the steps of:

heating a thermoluminescent material to generate a luminous flux;

using a photomultiplier supplied with an input voltage to detect luminosity corresponding to said generated luminous flux and to generate a current proportional to said detected luminosity; and measuring said generated current over a time interval corresponding to said generated luminous flux;

wherein said photomultiplier has a saturation threshold above which said luminosity corresponding to said generated luminous flux is not detected; the improvement comprising:

decreasing the sensitivity of said photomultiplier by decreasing its said input voltage each time said generated current attains a predetermined value corresponding to a said luminosity at or below said saturation threshold, each said decrease in input voltage being irreversible during said time interval.

2. In a thermoluminescent dosimeter comprising:

a thermoluminescent material;

a photomultiplier supplied with an input voltage, detecting luminosity corresponding to luminous flux generated by said thermoluminescent material and generating a current proportional to said detected luminosity, said photomultiplier having a saturation threshold above which said luminosity corresponding to said generated luminous flux is not detected; and means measuring said generated current over a time interval corresponding to said generated luminous flux; the improvement comprising:

means comparing said measured current to a predetermined value corresponding to a said luminosity at or below said saturation threshold; and means decreasing said input voltage each time said comparing means detects said measured current has attained said predetermined value, each said decrease in input voltage being irreversible during said time interval.

* * * * *